(12) United States Patent
Oyake et al.

(10) Patent No.: US 12,424,678 B2
(45) Date of Patent: Sep. 23, 2025

(54) BATTERY PACK

(71) Applicant: TOYODA GOSEI CO., LTD., Kiyosu (JP)

(72) Inventors: Takafumi Oyake, Nagakute (JP); Masanori Ishigaki, Nagakute (JP); Tomohisa Harada, Nagakute (JP); Makoto Kusakabe, Nagakute (JP); Kosuke Kusaba, Kiyosu (JP); Satoshi Yoshida, Kiyosu (JP); Kohei Fujii, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 541 days.

(21) Appl. No.: 17/908,281

(22) PCT Filed: Feb. 26, 2021

(86) PCT No.: PCT/JP2021/007434
§ 371 (c)(1),
(2) Date: Aug. 31, 2022

(87) PCT Pub. No.: WO2021/182138
PCT Pub. Date: Sep. 16, 2021

(65) Prior Publication Data
US 2023/0087721 A1     Mar. 23, 2023

(30) Foreign Application Priority Data
Mar. 10, 2020   (JP) .................. 2020-041169

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/643* (2015.04);
(Continued)

(58) Field of Classification Search
CPC ........... H01M 10/6551; H01M 10/613; H01M 10/643; H01M 10/6555; H01M 10/6568;
(Continued)

(56) References Cited

U.S. PATENT DOCUMENTS

| | | |
|---|---|---|
| 2011/0212356 A1 | 9/2011 | Tennessen et al. |
| 2012/0003522 A1 | 1/2012 | Fuhr et al. |
| 2016/0285142 A1 | 9/2016 | Kimura |

FOREIGN PATENT DOCUMENTS

| | | | | |
|---|---|---|---|---|
| JP | 2016-178066 A | 10/2016 | | |
| JP | 2018032507 A | * 3/2018 | ......... | H01M 10/659 |
| JP | 2018-60594 A | 4/2018 | | |

OTHER PUBLICATIONS

International Search Report of the International Searching Authority mailed Apr. 20, 2021 in corresponding International Patent Application No. PCT/JP2021/007434 (with English translation).

* cited by examiner

*Primary Examiner* — Karie O'Neill Apicella
(74) *Attorney, Agent, or Firm* — Posz Law Group, PLC (57) ABSTRACT

A partial battery pack structure includes a battery group, heat transfer plates, and a radiator, and is formed by stacking layers. Each layer arranges cylindrical batteries in parallel in a plane. The batteries in adjacent layers have alignment pitches shifted by a half pitch from each other. Each heat transfer plate contacts side surfaces of the batteries on both surfaces of the heat transfer plates, is formed by a heat transfer corrugated plate member, and extends through a gap between the batteries along an alignment direction of the cylindrical batteries in the layers in the plane intersecting (Continued)

center axis lines of the cylindrical batteries, a first intersection direction intersecting the alignment direction or a second intersection direction intersecting the alignment direction and the first intersection direction. The radiator is on a side of the battery group and connects with each heat transfer plate. Each battery contacts two or more heat transfer plates.

5 Claims, 5 Drawing Sheets

(51) Int. Cl.
    *H01M 10/643*     (2014.01)
    *H01M 10/6555*     (2014.01)
    *H01M 10/6556*     (2014.01)
    *H01M 10/6568*     (2014.01)
    *H01M 10/66*     (2014.01)
    *H01M 50/213*     (2021.01)
    *H01M 50/24*     (2021.01)
    *H01M 50/291*     (2021.01)
    *H01M 50/512*     (2021.01)

(52) U.S. Cl.
    CPC ... *H01M 10/6555* (2015.04); *H01M 10/6556* (2015.04); *H01M 10/6568* (2015.04); *H01M 10/66* (2015.04); *H01M 50/213* (2021.01); *H01M 50/24* (2021.01); *H01M 50/291* (2021.01); *H01M 50/512* (2021.01)

(58) Field of Classification Search
    CPC .... H01M 10/66; H01M 50/24; H01M 50/291; H01M 50/213; H01M 50/512
    See application file for complete search history.

BATTERY PACK

CROSS REFERENCE TO RELATED APPLICATION APPLICATIONS

This application is a U.S. national stage application of PCT/JP2021/007434 filed on Feb. 26, 2021 and is based upon and claims benefit of priority from Japanese Patent Application No. 2020-41169, filed on Mar. 10, 2020, the entire contents of which are incorporated herein by reference.

FIELD

The present disclosure relates to a structure of a battery pack which is formed by combining a plurality of batteries.

BACKGROUND

In a case where there is a demand for a high voltage and a large capacity for a power source of an electric vehicle and the like, a battery pack formed by combining multiple batteries is used. While there is a request for miniaturization of a battery pack from a viewpoint of mountability, if the battery pack is miniaturized to increase a battery density, there is a problem of heat radiation of heat generated by the batteries. Furthermore, there is a case where a battery pack is heated from an outside when used in an environment of a low temperature, and a warm-up time matters.

US2011/0212356A1 discloses a technique which flows a fluid to a flow passage which extends in a wavelike manner between cylindrical batteries, and cools the cylindrical batteries. JP2018-60594A discloses a technique which improves heat transfer capability by devising an arrangement of cylindrical batteries. JP2016-178066A discloses a technique which blows wind between cylindrical batteries and cools the cylindrical batteries.

SUMMARY

Technical Problem

A structure of a battery pack is demanded which is a small and simple structure, and which has a good heat radiation property and has good thermoresponsiveness.

Solution to Problem

A first aspect of the present disclosure provides a partial structure of a battery pack. This partial structure of the battery pack includes: a battery group which is formed by stacking a plurality of layers, each of the layers being formed by arranging cylindrical batteries in parallel in a plane, the cylindrical batteries belonging to adjacent layers being arranged by shifting alignment pitches by a half pitch from each other between the adjacent layers; heat transfer plates, wherein each of the heat transfer plates is in contact with side surfaces of the cylindrical batteries arranged on both surfaces of each of the heat transfer plates, is formed by a heat transfer corrugated plate member, and extends through a gap between the cylindrical batteries along an alignment direction of the cylindrical batteries in the layers in the plane intersecting center axis lines of the cylindrical batteries, a first intersection direction intersecting the alignment direction or a second intersection direction intersecting the alignment direction and the first intersection direction; and a radiator which is arranged on a side of the battery group and is connected with a edge of each of the heat transfer plates, wherein each of the cylindrical batteries is contact with at least two of the heat transfer plates.

According to the above aspect, the cylindrical batteries are arranged in a houndstooth pattern, it is possible to increase an arrangement density of the cylindrical batteries, and miniaturize the battery pack. Furthermore, the heat transfer plates formed by a conductive corrugated plate member achieve a simple configuration matching the houndstooth pattern arrangement of the cylindrical batteries, so that it is possible to improve a heat radiation property. Furthermore, by using the heat transfer plates, it is possible to reduce a heat capacity of the battery pack compared to a case where a heat transfer material is filled between the cylindrical batteries, and improve thermoresponsiveness.

In the above aspect, the battery group may include a first side and a second side in a direction in which the layers are stacked, a number of the cylindrical batteries belonging to each layer increases one by one from the first side to the second side, the radiator may be arranged on at least the second side, and the heat transfer plates may include a first direction heat transfer plate which extends in the first intersection direction, and a second direction heat transfer plate which extends in the second intersection direction, a number of the heat transfer plates crossing each of the layers being added in proportion to an increase of the number of the cylindrical batteries, and each of the heat transfer plates being connected to the radiator on the second side.

According to the above aspect, it is possible to arrange the heat transfer plates even in the alignment in which the number of the cylindrical batteries increases from the first side to the second side.

In the above aspect, an edge of the added heat transfer plate which faces toward the first side may not be connected with another heat transfer plate of the heat transfer plates.

In the above aspect, an edge of the added heat transfer plate which faces toward the first side may be connected with the another heat transfer plate of the heat transfer plates.

the above aspect may further comprise a radiator arranged on the first side in addition to the radiator arranged on the second side, and a heat transfer plate, of the heat transfer plates, which crosses a layer closest to the first side may be connected to the radiator arranged on the first side.

A second aspect of the present disclosure provides a battery pack which forms a hexagonal shape by arranging cylindrical batteries in parallel, and in which a plurality of the cylindrical batteries aligned in the hexagonal shape are concentrically arranged. This battery pack includes the partial structure of the battery pack according to any one of the first aspect at a part corresponding to each side of the hexagonal shape.

Another aspect of the present disclosure provides a battery pack which employs a configuration where battery pack modules in which the number of cylindrical batteries belonging to layers of the cylindrical batteries increases one by one from the first side to the second side are combined in a hexagonal shape.

DESCRIPTION OF EMBODIMENTS

Figure 1:
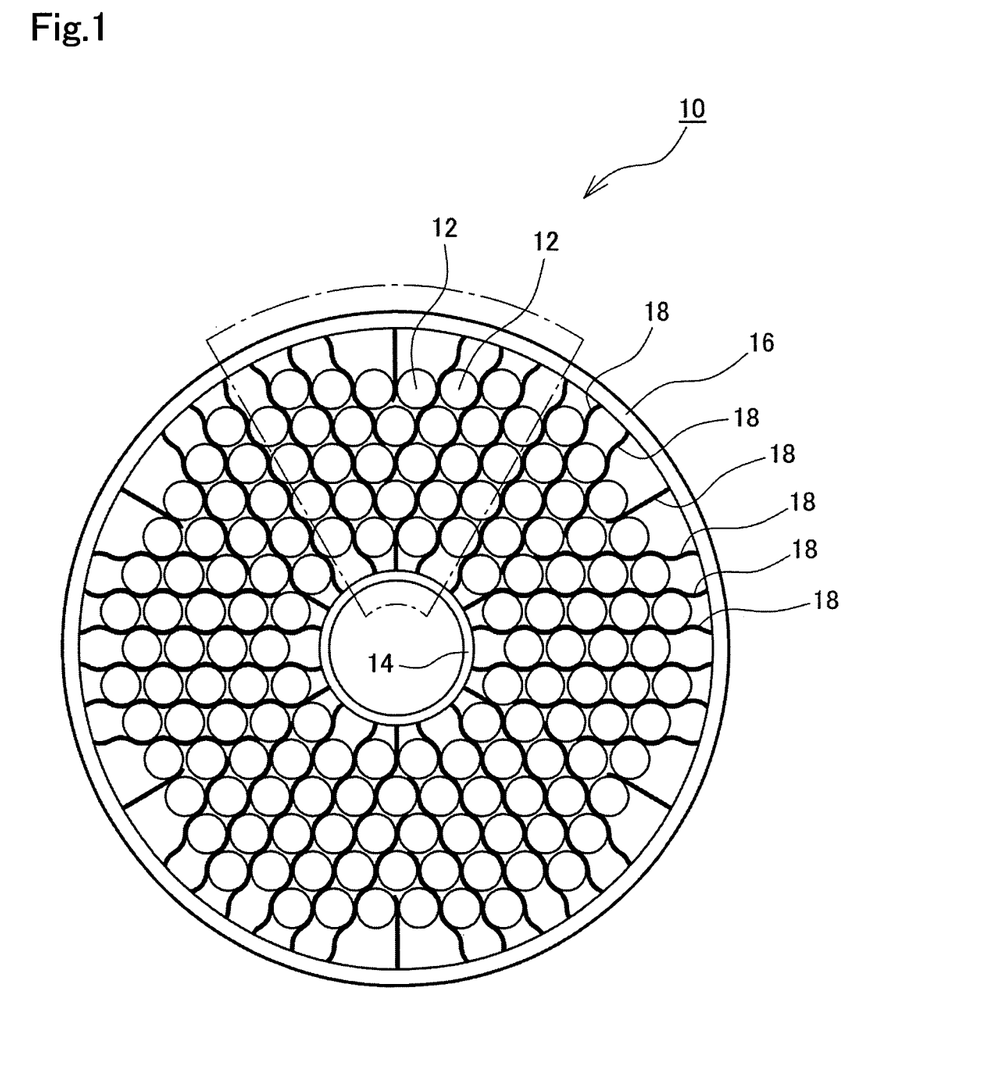
FIG. 1 is a view schematically illustrating a cross section intersecting cylindrical batteries of a battery pack according to the present embodiment.
Figure 2:
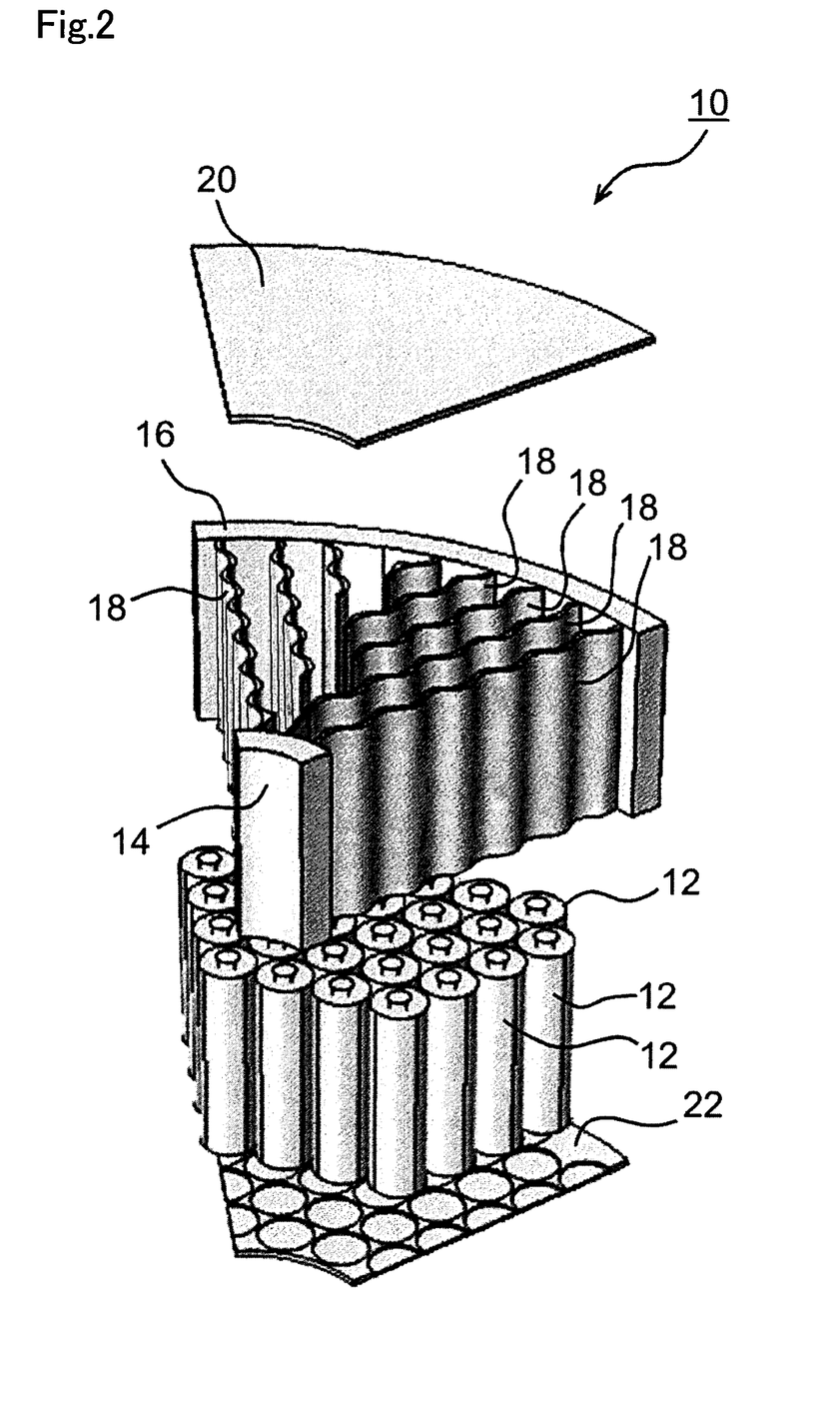
FIG. 2 is an exploded perspective view schematically illustrating part of the battery pack.

An embodiment according to the present disclosure will be described below with reference to drawings. FIG. 1 is a view illustrating a battery pack 10 according to the present embodiment, and is a view schematically illustrating a cross section which intersects center axis lines of so-called cylindrical batteries 12 whose external shapes are columnar shapes. FIG. 2 is a view illustrating part of the battery pack 10, and is a perspective view illustrating disassembled parts.

The plurality of cylindrical batteries 12 are arranged in an annular space between a concentrically arranged inner radiator 14 and outer radiator 16 of two cylindrical shapes. The cylindrical batteries 12 each have the same shape, and are arranged such that the center axis lines of the cylinders are parallel. The cylindrical batteries 12 on the inner side are arranged in a hexagonal shape, and the cylindrical batteries 12 are arranged in the hexagonal shape on an outer side so as to surround these cylindrical batteries 12. The cylindrical batteries which are adjacent to each other and arranged in the hexagonal shape are aligned with alignment pitches shifted by a half pitch. Furthermore, the cylindrical batteries 12 are aligned on the outer side likewise, and the four hexagonal shapes are formed in total in this battery pack 10. Although the cylindrical batteries 12 are arranged on a still outer side, these cylindrical batteries 12 are arranged in a hexagonal shape without vertices. By arranging the cylindrical batteries 12 in a houndstooth pattern with the alignment pitch shifted by the half pitch, the another cylindrical battery 12 gets in a valley part which forms outer shapes of the two cylindrical batteries 12 to increase an arrangement density of the cylindrical batteries 12.

Heat transfer plates 18 of corrugated shapes which extend weaving through gaps between the cylindrical batteries 12 from the inner side to the outer side are arranged. The heat transfer plate 18 is formed by a heat transfer material formed in a corrugated plate shape, and the material itself transfers heat. The heat transfer plate 18 can be formed by, for example, a metal plate and, more particularly, an aluminum plate. Dimensions of the cylindrical batteries 12 and the heat transfer plates 18 are substantially equal in a center axis line direction of the cylindrical batteries 12. The heat transfer plate 18 has curved parts which go along side surfaces of the cylindrical batteries 12. The heat transfer plate 18 is in contact with part of a circumferential direction of the side surfaces of the cylindrical batteries 12 and in a belt-like area which extends in a longitudinal direction of the cylindrical batteries 12. The heat transfer plate 18 may be in direct contact with the cylindrical batteries 12, or may be in contact with the cylindrical batteries 12 with an adhesive interposed therebetween. This contact improves heat transfer efficiency compared to a case where the heat transfer plates 18 contact air.

Some of the heat transfer plates 18 have inner edges connected to the inner radiator 14 and outer edges connected to the outer radiator 16, and the rest of the heat transfer plates 18 are connected only to the outer radiator 16. Heat generated by the cylindrical battery 12 transfers through the heat transfer plate 18, and goes to the inner radiator 14 and the outer radiator 16 connected with this heat transfer plate 18.

The inner radiator 14 and the outer radiator 16 are formed by a heat transfer material such as metal and, more particularly, aluminum, and radiate, from a face on an opposite side to a face facing the cylindrical battery 12, heat having transferred from the heat transfer plate 18. Furthermore, fins may be provided on a surface of one or both of the inner radiator 14 and the outer radiator 16 to promote heat radiation. Furthermore, a flow passage may be formed inside one or both of the inner radiator 14 and the outer radiator 16 to flow a fluid in this flow passage, and radiate the heat to this fluid.

End surface plates 20 and 22 are arranged at both ends of a space between the inner radiator 14 and the outer radiator 16 to form the space in which the cylindrical batteries 12 are arranged as a closed space.

Figure 3:
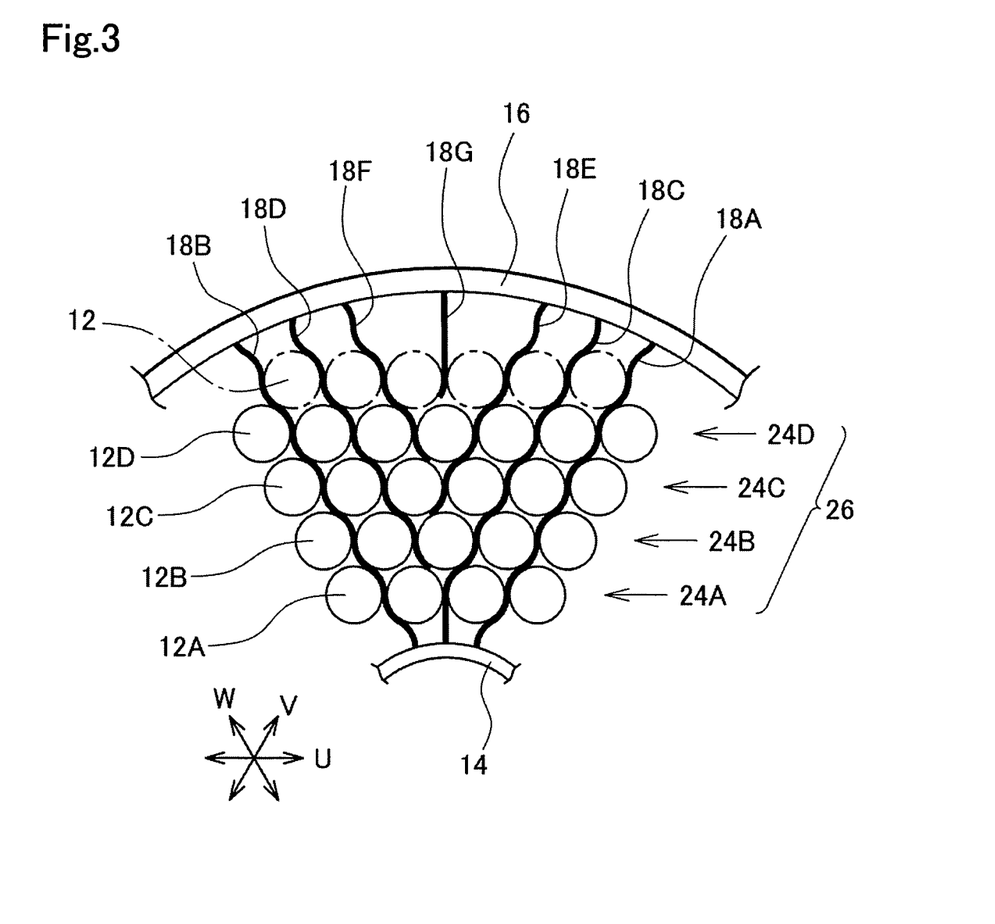
FIG. 3 is a cross-sectional view schematically illustrating one example of a structure of part of the battery pack.

FIG. 3 is a view illustrating an enlarged configuration of a part corresponding to one side of the hexagonal shape in which the cylindrical batteries 12 are arranged such as a part surrounded by a dashed-dotted line in FIG. 1.

The four cylindrical batteries 12 close to the inner radiator 14 are arranged in one plane, and are aligned in a left-right direction in FIG. 3 such that the center axis lines are parallel. These four cylindrical batteries 12 form one layer. This layer will be referred to as a first alignment layer 24A, and cylindrical batteries belonging to this first alignment layer 24A will be referred to as cylindrical batteries 12A when the cylindrical batteries need to be distinguished. The five cylindrical batteries 12 adjacent to the first alignment layer 24A form a second alignment layer 24B. Cylindrical batteries belonging to this second alignment layer 24B will be referred to as cylindrical batteries 12B when the cylindrical batteries need to be distinguished. The cylindrical batteries 12B are arranged in one plane, and are aligned in the left-right direction in FIG. 3 such that the center axis lines are parallel. The cylindrical batteries 12A and the cylindrical batteries 12B have alignment pitches shifted by a half pitch from each other, and each get in valley parts formed by the side surfaces of the adjacent cylindrical batteries of the alignment layer on the other party side. The six cylindrical batteries 12 adjacent to the second alignment layer 24B form a third alignment layer 24C, and, moreover, the seven cylindrical batteries 12 adjacent to the third alignment layer 24C form a fourth alignment layer 24D. The cylindrical batteries belonging to the third alignment layer 24C will be referred to as cylindrical batteries 12C, and the cylindrical batteries belonging to the fourth alignment layer 24D will be referred to as cylindrical batteries 12D. The cylindrical batteries 12C and 12D belonging to the third alignment layer 24C and the fourth alignment layer 24D are also arranged by being shifted by a half pitch from the cylindrical batteries of the adjacent layer similar to the cylindrical batteries 12A and 12B belonging to the first and second alignment layers 24A and 24B. In a case where the first to fourth alignment layers 24A to 24D do not need to be distinguished or will be collectively described, the first to fourth alignment layers 24A to 24D will be referred to as alignment layers 24.

The partial structure of the battery pack 10 including a battery group 26 including the first to fourth alignment layers 24A to 24D will be described. The partial structure includes the inner radiator 14 arranged on a first side (a lower side in FIG. 3) of the battery group 26, and the outer radiator 16 arranged on a second side (an upper side in FIG. 3) on a side opposite to the first side in a direction (an upper-lower direction in FIG. 3) in which each alignment layer 24 is stacked. The first side and the second side are an inner side and an outer side of the battery pack 10 of a cylindrical shape, respectively, and the first side will be referred to as the inner side and the second side will be referred to as the outer side in the following description.

In each alignment layer 24 which makes up the battery group 26, the number of the cylindrical batteries 12 belonging to each alignment layer 24 increases one by one from the first alignment layer 24A on the inner side to the fourth alignment layer 24D on the outer side. Although the cylindrical batteries 12 are aligned in the plane which defines each alignment layer 24, the cylindrical batteries 12 are respectively aligned in one plane along two directions, too, which intersect this alignment layer 24. A direction in which the cylindrical batteries 12 are aligned in each alignment layer 24 will be referred to as a battery alignment direction U. The cylindrical batteries 12 are aligned in the two directions, too, which intersect the battery alignment direction U at 60°, and these directions will be referred to as a first intersection direction V and a second intersection direction W. Gaps between the cylindrical batteries 12 extend along these directions U, V and W.

The six heat transfer plates 18 relate to the battery group 26, and are denoted by reference numerals 18A, 18B, 18C, 18D, 18E and 18F. In addition, a heat transfer plate 18G associated with the cylindrical batteries 12 indicated by a dashed-dotted line and located on a still outer side of the fourth alignment layer 24D is provided. Each cylindrical battery 12 is in contact with at least the two heat transfer plates 18. The cylindrical batteries 12 are in contact with top and back surfaces of each heat transfer plate 18. Furthermore, the heat transfer plates 18 do not contact and intersect each other. Although FIG. 3 illustrates that the cylindrical batteries 12 located at the edges of each alignment layer 24 are in contact with only the one heat transfer plate 18, the cylindrical batteries 12 are in contact with the heat transfer plate 18 belonging to the adjacent partial structure, and are actually in contact with the two heat transfer plates 18 as illustrated in FIG. 1.

The heat transfer plates 18A to 18C cross the first to fourth alignment layers 24A to 24D, and have the inner edges connected to the inner radiator 14 and the outer edges connected to the outer radiator 16. The heat transfer plate 18A and the heat transfer plate 18C are first direction heat transfer plates which extend in the first intersection direction V, and the heat transfer plate 18B is a second direction heat transfer plate which extends in the second intersection direction W. The heat transfer plates 18A to 18C each enter three gaps formed between the adjacent cylindrical batteries 12A in the first alignment layer 24A, and cross the first alignment layer 24A.

The number of the cylindrical batteries 12B belonging to the second alignment layer 24B is five, the number of gaps between the adjacent cylindrical batteries 12B is four, and one gap increases compared to the first alignment layer 24A. The heat transfer plate 18D is added to fill this increased part. The heat transfer plate 18D crosses the second alignment layer 24B, and extends outward along the second intersection direction W to connect to the outer radiator 16. The heat transfer plate 18D is the second direction heat transfer plate which extends along the second intersection direction W. The heat transfer plate 18D crosses the third and fourth alignment layers 24C and 24D, too, in addition to the second alignment layer 24B. In this regard, that the heat transfer plate 18 crosses the alignment layer 24 described herein refers to that the heat transfer plate 18 crosses the closest parts of the adjacent cylindrical batteries 12 and is arranged in contact with the cylindrical batteries 12 on the both sides, and does not require that the heat transfer plate 18 is arranged in an entire thickness direction of the alignment layer 24.

The number of the cylindrical batteries 12C belonging to the third alignment layer 24C is six, the number of gaps between the adjacent cylindrical batteries 12C is five, and one gap increases compared to the second alignment layer 24B. The heat transfer plate 18E is added to fill this increased part. The heat transfer plate 18E crosses the third alignment layer 24C, and extends outward along the first intersection direction V to connect to the outer radiator 16. The heat transfer plate 18E is the first direction heat transfer plate which extends along the first intersection direction V. The heat transfer plate 18E crosses the fourth alignment layer, too, in addition to the third alignment layer 24C.

The number of the cylindrical batteries 12D belonging to the fourth alignment layer 24D is seven, the number of gaps between the adjacent cylindrical batteries 12D is six, and one gap increases compared to the third alignment layer 24C. The heat transfer plate 18F is added to fill this increased part. The heat transfer plate 18F crosses the fourth alignment layer 24D, and extends outward along the second intersection direction W to connect to the outer radiator 16. The heat transfer plate 18F is the second direction heat transfer plate which extends along the second intersection direction W.

Although extension directions of the added heat transfer plates 18D to 18F are alternate in order of inner edges closer to the inner side, the order is not limited to this. For example, all of the added heat transfer plates may extend in the first intersection direction or the second intersection direction.

Heat generated by the cylindrical batteries 12 transfers through the heat transfer plates 18, and goes to the inner radiator 14 and the outer radiator 16. Furthermore, when the one cylindrical battery 12 causes abnormal heating, the cylindrical batteries 12 located sandwiching the heat transfer plate 18 can suppress a rise in a temperature since the heat transfer plate 18 dissipates heat. Furthermore, the cylindrical battery 12 which faces without the heat transfer plate 18, that is, directly the cylindrical battery 12 which has caused abnormal heating can suppress the rise in the temperature by providing a gap between these cylindrical batteries 12 and providing a layer of air.

Figure 4:
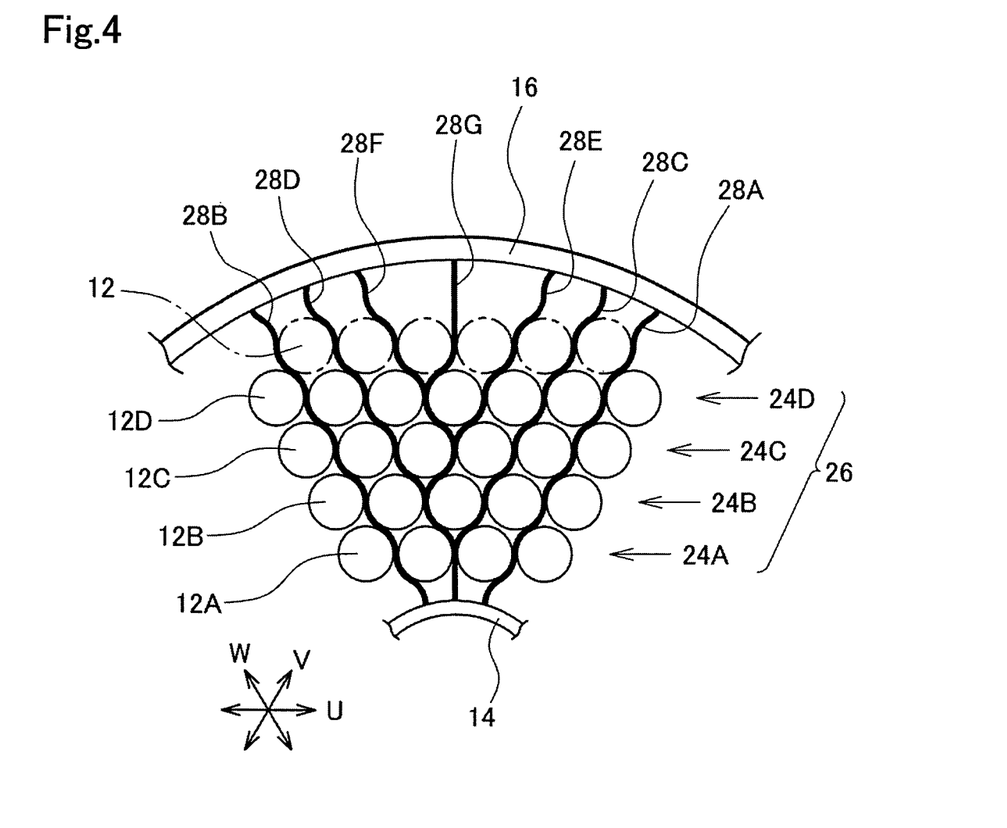
FIG. 4 is a cross-sectional view schematically illustrating another example of the structure of the part of the battery pack.

FIG. 4 is a view illustrating another aspect of the partial structure of the battery pack. According to this aspect, a structure of a heat transfer plate differs from the partial structure illustrated in FIG. 3, and other components are identical and therefore will be assigned identical reference numerals, and description thereof will be omitted.

Heat transfer plates 28A to 28F of the partial structure of the battery pack illustrated in FIG. 4 correspond to the above-described heat transfer plates 18A to 18F, respectively. The heat transfer plates 28A to 28F will be referred to as heat transfer plates 28 by omitting A to F in a case where the heat transfer plates 28A to 28F do not need to be distinguished or will be collectively described. In this regard, a heat transfer plate 28G associated with the cylindrical battery 12 aligned on an outer side of the fourth alignment layer 24D corresponds to the above-described heat transfer plate 18G.

The heat transfer plates 28A to 28C are identical to the above-described heat transfer plates 18A to 18C. The heat transfer plate 28D extends closer to an inner side than the above-described heat transfer plate 18D until reaching the heat transfer plate 28C to connect to the heat transfer plate 28C. The heat transfer plate 28E extends closer to the inner side than the above-described heat transfer plate 18E until reaching the heat transfer plate 28D to connect to the heat transfer plate 28D. The heat transfer plate 28F extends closer to the inner side than the above-described heat transfer plate 18F until reaching the heat transfer plate 28E to connect to the heat transfer plate 28E. The heat transfer plate 28G extends closer to the inner side than the above-described heat transfer plate 18G until reaching the heat transfer plate 28F to connect to the heat transfer plate 28F. As described above, the heat transfer plates 28D to 28G correspond to the above-described heat transfer plates 18D to 18G which are extended to reach the other heat transfer plates 28. The added heat transfer plates 28D to 28G have inner edges connected to the other heat transfer plates 28, and inner and outer edges are supported, and so that the heat transfer plates 28D to 28G stabilize. Each heat transfer plate 28 does not intersect each other. In this structure, too, each cylindrical battery 12 is in contact with at least the two heat transfer plates.

Figure 5:
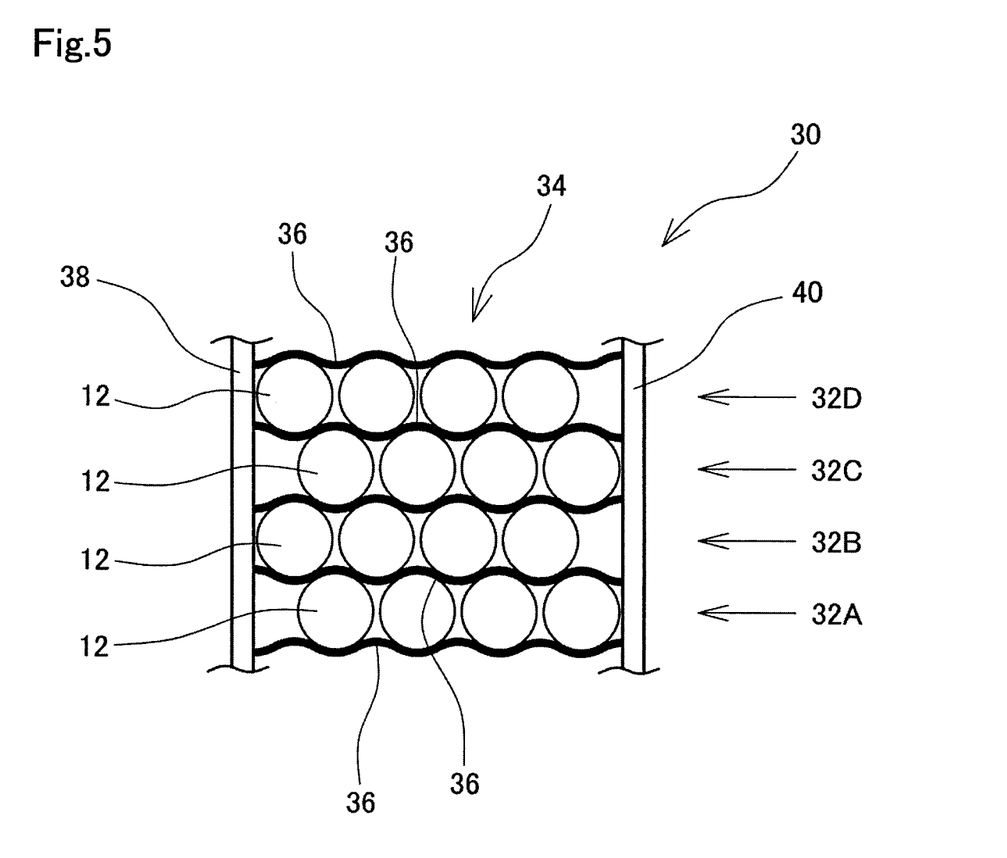
FIG. 5 is a cross-sectional view schematically illustrating a structure of part of another battery pack.

FIG. 5 is a schematic view illustrating one example of the battery pack or a partial structure 30 of the battery pack, and is a schematic view illustrating a cross section which intersects center axis lines of the so-called cylindrical batteries 12 whose outer shapes are cylindrical shapes. The cylindrical batteries 12 are aligned in parallel in one plane to form one layer. This layer will be referred to as an alignment layer 32. FIG. 5 illustrates a configuration which includes four alignment layers 32A to 32D. In a case where the four alignment layers 32A to 32D do not need to be distinguished or will be collectively described, the four alignment layers 32A to 32D will be referred to simply as the alignment layers 32 by omitting A to D. Furthermore, a direction in which the cylindrical batteries 12 are aligned in the one alignment layer 32 will be referred to as a battery alignment direction. In FIG. 5, the battery alignment direction is the left-right direction.

The alignment layers 32A to 32D each include the same number of the cylindrical batteries 12. FIG. 5 illustrates the alignment layer 32 which includes the four cylindrical batteries 12. Furthermore, the alignment layer which includes the n cylindrical batteries 12 and the alignment layer which includes the n+1 cylindrical batteries 12 may be alternately stacked. The cylindrical batteries 12 belonging to the adjacent alignment layers 32 are arranged with alignment pitches shifted by a half pitch from each other, and get in valley parts formed by the side surfaces of the two adjacent cylindrical batteries 12 belonging to the alignment layer 32 on the other party side. Consequently, a battery group 34 is formed in which the cylindrical batteries 12 are arranged between the adjacent alignment layers 32 by being shifted by the half pitch from each other.

Heat transfer plates 36 of corrugated shapes which extend weaving through gaps between the alignment layers 32 are arranged. A direction in which the heat transfer plates 36 extend is the battery alignment direction. The heat transfer plate 36 is formed by a heat transfer material formed in a corrugated shape, and the material itself transfers heat. The heat transfer plate 36 can be formed by, for example, a metal plate and, more particularly, an aluminum plate. Dimensions of the cylindrical batteries 12 and the heat transfer plates 36 are substantially equal in the center axis line direction of the cylindrical batteries 12. The heat transfer plate 36 has curved parts which go along the side surfaces of the cylindrical batteries 12. The heat transfer plate 36 is in contact with part of the circumferential direction of the side surfaces of the cylindrical batteries 12 and in a belt-like area which extends in the longitudinal direction of the cylindrical batteries 12.

The heat transfer plate 36 may be in direct contact with the cylindrical batteries 12, or may be in contact with the cylindrical batteries 12 with an adhesive interposed therebetween. This contact improves heat transfer efficiency compared to a case where the heat transfer plates 36 contact air.

Radiators 38 and 40 are arranged on both sides of the battery group 34 in the battery alignment direction, and edges on both sides of each heat transfer plate 36 are connected to the radiators 38 and 40. Heat generated by the cylindrical battery 12 transfers through the heat transfer plate 36, and goes to the radiators 38 and 40. The radiators 38 and 40 are formed by a heat transfer material such as metal and, more particularly, aluminum, and radiate, from the face on the opposite side to the face facing the cylindrical battery 12, heat having transferred from the heat transfer plate 36. Furthermore, fins may be provided on a surface of one or both of the two radiators 38 and 40 to promote heat radiation. Furthermore, a flow passage may be formed inside one or both of the radiators 38 and 40 to flow a fluid in this flow passage, and radiate the heat to this fluid. Only one of the radiators 38 and 40 may be provided.

The corrugated shapes of the heat transfer plates 18 and 36 have the curved parts which go along the side surfaces of the cylindrical batteries 12, yet are not limited to these shapes, and may have triangular wave shapes in which flat plates are arranged in a zigzag manner.

Although the battery pack 10 is formed by combining the six partial structures illustrated in FIG. 3 or 4, the single partial structure or an arbitrary number of combined partial structures may make up the battery pack. For example, the three partial structures may be combined to make up the battery pack such that a cross section is semicircular as a whole.

The invention claimed is:

1. A partial structure of a battery pack comprising:
a battery group which is formed by stacking a plurality of layers, each of the layers being formed by arranging cylindrical batteries in parallel in a plane, the cylindrical batteries belonging to adjacent layers being arranged by shifting alignment pitches by a half pitch from each other between the adjacent layers;
heat transfer plates, wherein each of the heat transfer plates is in contact with side surfaces of the cylindrical batteries arranged on both surfaces of each of the heat transfer plates, is formed by a heat transfer corrugated plate member, and extends through a gap between the cylindrical batteries along an alignment direction of the cylindrical batteries in the layers in the plane intersecting center axis lines of the cylindrical batteries, a first intersection direction intersecting the alignment direction or a second intersection direction intersecting the alignment direction and the first intersection direction; and
a radiator which is arranged on a side of the battery group and is connected with a edge of each of the heat transfer plates,
wherein each of the cylindrical batteries is contact with at least two of the heat transfer plates, wherein
the battery group includes a first side and a second side in a direction in which the layers are stacked, a number of the cylindrical batteries belonging to each layer increases one by one from the first side to the second side,
the radiator is arranged on at least the second side, and
the heat transfer plates include a first direction heat transfer plate which extends in the first intersection direction, and a second direction heat transfer plate which extends in the second intersection direction, a number of the heat transfer plates crossing each of the layers being added in proportion to an increase of the number of the cylindrical batteries, and each of the heat transfer plates being connected to the radiator on the second side.

2. The partial structure of the battery pack according to claim 1, wherein an edge of the added heat transfer plate which faces toward the first side is not connected with another heat transfer plate of the heat transfer plates.

3. The partial structure of the battery pack according to claim 1, wherein an edge of the added heat transfer plate which faces toward the first side is connected with another heat transfer plate of the heat transfer plates.

4. The partial structure of the battery pack according to claim 1, further comprising a radiator arranged on the first side in addition to the radiator arranged on the second side, wherein a heat transfer plate, of the heat transfer plates, which crosses a layer closest to the first side is connected to the radiator arranged on the first side.

5. A battery pack which forms a hexagonal shape by arranging cylindrical batteries in parallel, and in which a plurality of the cylindrical batteries aligned in the hexagonal shape are concentrically arranged, the battery pack comprising the partial structure of the battery pack according to claim 1 at a part corresponding to each side of the hexagonal shape.

* * * * *